United States Patent [19]
Herrera

[11] Patent Number: 5,890,857
[45] Date of Patent: Apr. 6, 1999

[54] FASTENER SYSTEM INCLUDING A CLAMP-FORCE INDICATING INSERT

[75] Inventor: Richard Jay Herrera, Chandler, Ariz.

[73] Assignee: U-Haul International, Inc., Phoenix, Ariz.

[21] Appl. No.: 61,829

[22] Filed: Apr. 16, 1998

[51] Int. Cl.[6] .............................. F16B 31/02; F16B 37/08
[52] U.S. Cl. .............................. 411/11; 411/14; 411/303; 411/432
[58] Field of Search .................... 411/8–11, 14, 411/13, 303, 432

[56] References Cited

U.S. PATENT DOCUMENTS

| | | |
|---|---|---|
| 248,975 | 11/1881 | Wooten . |
| 1,809,620 | 6/1931 | Cole . |
| 2,325,303 | 7/1943 | Brooke . |
| 2,348,308 | 5/1944 | Richardson . |
| 2,369,865 | 2/1945 | Spencer ..................................... 411/11 |
| 2,499,104 | 2/1950 | Lovell . |
| 2,502,642 | 4/1950 | Currlin . |
| 2,928,445 | 3/1960 | Van Buren, Jr. . |
| 3,316,952 | 5/1967 | Hollinger .............................. 411/303 X |
| 3,469,492 | 9/1969 | Dahl ........................................... 411/11 |
| 3,520,342 | 7/1970 | Scheffer . |
| 3,635,272 | 1/1972 | Scheffer . |
| 3,854,372 | 12/1974 | Gutshall . |
| 4,126,170 | 11/1978 | DeHaitre ................................... 411/303 |
| 4,367,060 | 1/1983 | Berecz ...................................... 411/303 |
| 5,015,132 | 5/1991 | Turner et al. .............................. 411/10 |
| 5,188,494 | 2/1993 | Hatin .......................................... 411/10 |
| 5,443,332 | 8/1995 | Hollis ................................... 405/259.6 |

FOREIGN PATENT DOCUMENTS

| | | | |
|---|---|---|---|
| 3148730 | 7/1983 | Germany .................................. 411/10 |
| 229242 | 9/1990 | United Kingdom ..................... 411/10 |

*Primary Examiner*—Neill Wilson
*Attorney, Agent, or Firm*—Jeffer, Mangels, Butler & Marmaro LLP

[57] ABSTRACT

There is provided a fastening device which includes a nut having a body. The body has a top face and a bottom face. The body further has an orifice extending therethrough. The system also includes a clamp-force indicating insert for use with the nut. The insert includes a portion extrudable across the top face of the nut. The nut further includes at least one insert-engaging portion.

35 Claims, 4 Drawing Sheets

FASTENER SYSTEM INCLUDING A CLAMP-FORCE INDICATING INSERT

FIELD OF THE INVENTION

The present invention relates to a fastener system which includes a clamp-force indicating insert.

BACKGROUND OF THE INVENTION

Inserts for providing an indication of a clamp-force exerted by a nut threaded on a bolt are known in the art. These inserts function to indicate that an appropriate clamp force has been achieved by the tightening of the nut on the bolt. However, upon loosening of the nut, these inserts are not rotationally coupled to the nut. Therefore, when the nut is loosened, the insert often becomes disengaged from the nut. The insert must then be inconveniently, separately screwed off the bolt or cut off. Additionally, separation of the compressed insert from the nut allows the loosened nut to spin freely off, increasing the likelihood of separation of the previously fastened components.

It would be desirable to have a nut which includes a clamp-force indicating insert which is rotationally coupled to the nut when the nut is loosened, thereby avoiding the inconveniences mentioned above. It would also be desirable to have a nut that would not spin freely off the fastener threads even after separation of the insert.

SUMMARY OF THE INVENTION

In accordance with one aspect of the present invention, there is provided a fastener system which includes a nut having a body. The body has a top face and a bottom face. The body further has an orifice extending therethrough. The system also includes a clamp-force indicating insert for use with the nut. The insert includes a deformable portion extrudable across the top face of the nut. The nut further includes at least one insert-engaging portion. The insert-engaging portions can be, for example, a protrusion, an indentation, a circumferential groove, or an adhesive, or the like. Additionally, since asymmetrical overall shape can accomplish the same rotational coupling as that which results from the addition of complementary indentations/projections to the perimeter of an otherwise circular design, insert engagement can be accomplished through any asymmetrical complementary shaping of the insert and corresponding nut orifice, sufficient to accomplish rotational coupling.

In one embodiment of the present invention, the top face of the nut further includes a recess disposed about the orifice and the clamp-force indicating insert further includes a portion for insertion into the recess.

In another embodiment of the present invention, the body of the nut includes a second orifice, through which a pin can be inserted.

In accordance with another aspect of the present invention, there is provided a fastener system which includes a nut having a body. The body has a top face and a bottom face. The body further has an orifice extending therethrough. The system also includes a clamp-force indicating insert for use with the nut. The insert includes a portion extrudable across the top face of the nut. The insert further includes at least one nut-engaging portion.

In accordance with yet another aspect of the present invention, there is provided a fastener system which includes a nut having a body. The body has a top face and a bottom face. The body further has an orifice extending therethrough. Rotation of the nut on a bolt extending through the orifice provides for the exertion of a clamp force by the nut against a surface. The fastener system also includes means for indicating the clamp force applied by the nut on the surface. The means for indicating the clamp force is disposed between the top face of the nut and the surface. The fastener system also includes means for rotationally coupling the nut and the clamp-force indicating means.

In accordance with still another aspect of the present invention there is provided a clamp-force indicating insert for use with a nut. The insert includes a portion for insertion into the recess of the nut. The insert also includes a portion for providing an indication of a clamp force and a nut-engaging portion.

In accordance with a further aspect of the present invention there is provided a nut for use with a clamp-force indicating insert, the nut having a body, the body having a top face and a bottom face, the body further having an orifice extending therethrough. The top face further includes an insert-engaging portion for rotationally coupling a clamp-force indicating insert to the nut. The insert engaging portion is selected from the group consisting of a recess disposed in the top face, the recess having an at least partially asymmetrical perimeter; a recess disposed in the top face, and a slot formed at least partially about the recess; and an orifice disposed through the at least one side face of the nut.

Other features and advantages of the invention will become apparent from the following detailed description, taken in conjunction with the accompanying drawings which illustrate, by way of example, various features of preferred embodiments of the invention.

DESCRIPTION OF THE FIGURES

The detailed description of the invention will be made with reference to the accompanying drawings, where like numerals designate corresponding parts of the figures. The drawings are meant to be generally illustrative of various examples of the present invention, but are merely examples and are not meant to be limiting of the scope of invention.

DETAILED DESCRIPTION OF THE INVENTION

Figure 1:
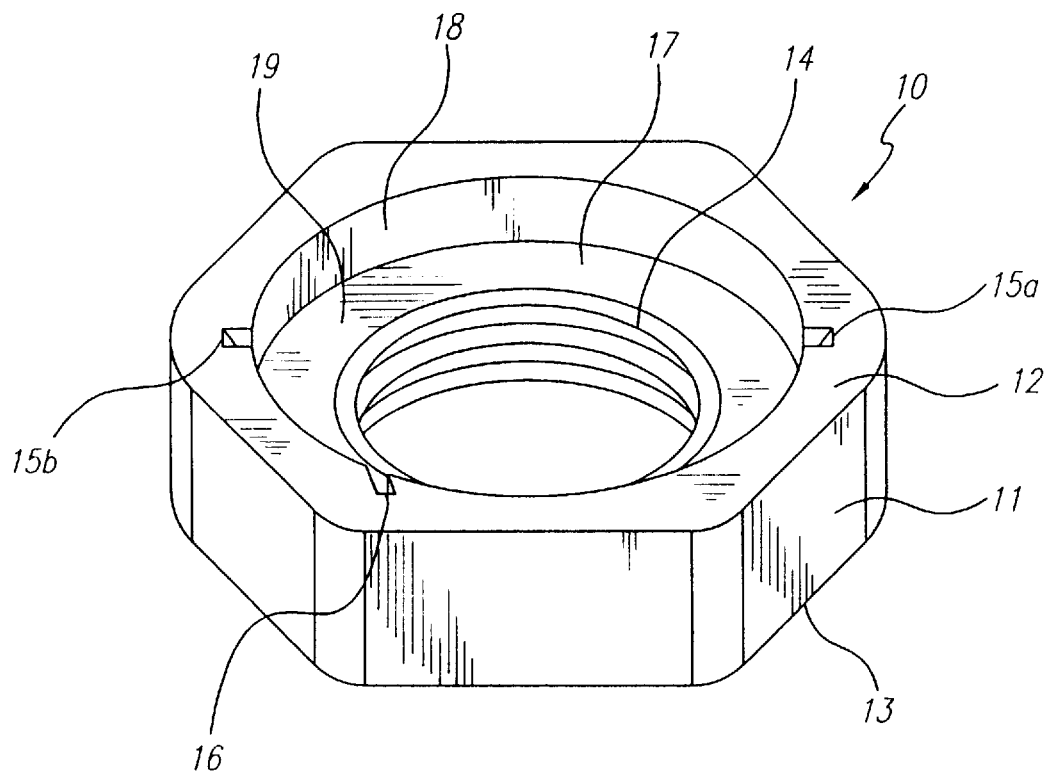
FIG. 1 is a top perspective view of a nut of the present invention.
Figure 2:
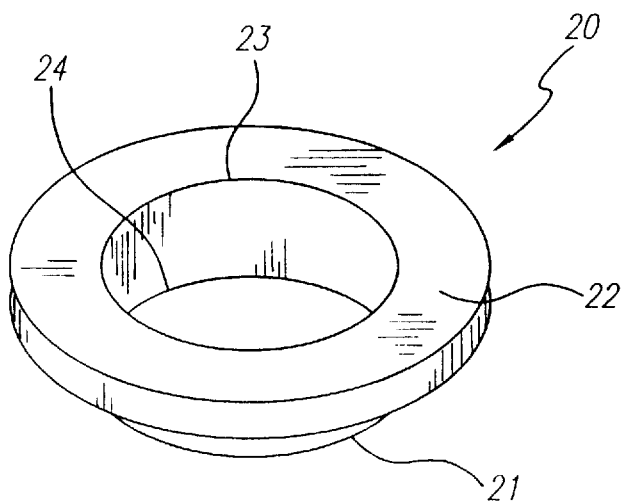
FIG. 2 is a top perspective view of a clamp-force indicating insert of the present invention.

As depicted in FIGS. 1–2, nut 10 includes a sidewall 11, a top face 12 and a bottom face 13. The top face is the clamping face, i.e., the face which is tightened against a surface through which a bolt has been extended. In a preferred embodiment, top face 12 includes a recess 19. The recess 19 includes a bottom wall 17 and a sidewall 18. Nut 10 also includes an orifice 14 therethrough. The orifice 14 is preferably threaded. Top face 12 includes insert-engaging portions 15a, 15b and 16. In this particular embodiment, insert-engaging portions 15a, 15b and 16 comprise indentations, such as slots. Slots 15a and 15b are preferably substantially perpendicular to a line tangent to orifice 14 at slots 15a or 15b. Slot 16 preferably forms a non-perpendicular angle to a line tangent to orifice 14 at slot 16. Either type of slot can be used in combination with additional slots of the same type or in combination with at least one additional slot of the other type. It is to be understood that only a single insert-engaging portion is necessary. However, one or more additional insert-engaging portions can be beneficially provided.

Figure 14:
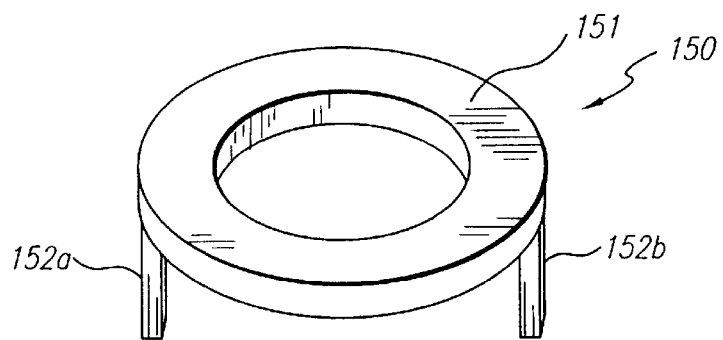
FIG. 14 is a top perspective view of another embodiment of a clamp-force indicating insert of the present invention.

Preferably, insert 20 includes a portion 22 extrudable across top face 12 of nut 10, and a portion 21 for insertion into recess 19. By extrudable, it is meant that this portion is squeezable in that under stress this portion compresses and stretches. Portion 21 includes opposed edges 23 and 24. If recess 19 is cylindrical then portion 21 is preferably cylindrical around its outer surface. Cylindrical portion 21 has a height and a diameter which allow it to be fitted within recess 19. Once cylindrical portion 21 is fitted within recess 19, portion 22 is disposed above top face 12. See FIG. 11. In a preferred embodiment, portion 22 is a deformable/extrudable lip. However, other embodiments are possible. For example, portion 22 can initially extend above portion 21 as a cylindrical tube. Upon the tightening of the nut against a surface, the surface will exert a force on portion 22 causing it to be extruded between top face 12 and the surface. In those embodiments in which nut 10 does not include recess 19, the insert can include tabs for engaging at least one sidewall and preferably two opposed sidewalls of nut 10. As depicted in FIG. 14 this type of insert, insert 150, has tabs 152a and 152b which are disposed about the outer edge of insert 150 for engaging two opposed sidewalls of the nut. Other arrangements and numbers of tabs can be used. For example, a continuous tab which engages the entire outer perimeter of the nut can be provided. Alternatively, insert 20 can be placed on a bolt to which nut 10 is to be threaded.

With insert 20 in place in nut 10, nut 10 can be affixed to a bolt (not shown) which has been inserted through at least one surface. The surface or surfaces can be any portion of any device, devices, materials and the like which are to be fastened by a nut and a bolt as is standard in the fastening art. Upon tightening of nut 10 on the bolt, top face 12 of nut 10 will rotate towards the surface through which the bolt extends. Portion 22 is interposed between this surface and top face 12. As nut 10 is tightened, portion 22 is compressed between this surface and nut top face 12.

This tightening of nut 10 has two effects. One effect is that a part of portion 22 is forced into slots 15a, 15b and 16. A second effect is that upon continued tightening of nut 10, a part of portion 22 is compressed to an extent which indicates that an appropriate clamp force is being exerted by nut 10. In a particular embodiment, the compression of portion 22 can include the complete severance of an outer part of lip 22 from an inner part of lip 22. This result occurs because insert 20 is formed of compressible, extrudable material, preferably plastic, and nut 10 is formed of substantially non-compressible, non-deformable material, preferably metal.

Once it is no longer desired that nut 10 apply a clamp force to the surface through which the bolt extends, nut 10 can be loosened and removed from the bolt. If a prior art clamp-force insert had been used, upon loosening, frequently the clamp-force insert would separate from the nut. The insert then had to be either inconveniently, separately rotated off or inconveniently cut off. However, the present invention prevents the separation of the insert and the nut, through the engagement of any one or all of slots 15a, 15b and 16 with a part of portion 22. The engagement between any one of slots 15a, 15b and 16 and a part of portion 22 provides for a rotational coupling of the nut and the insert, thereby preventing or at least greatly reducing the incidence of insert and nut separation. It is to be understood that in this embodiment of the invention, insert 20 initially need not and preferably does not include portions which engage nut 10 prior to the application of a clamping force to insert 20. The application of the clamping force deforms the insert and forces a portion of it into engaging portions on the nut and thereby rotationally couples the nut and the insert. As described in more detail below, in alternative embodiments, insert 20 includes preformed portions which engage complementary portions shaped in the nut prior to an application of a clamping force.

Insert 20 is formed of a compressible material, particularly an extrudable material, and most particularly a severable material that will sever under desired clamp forces. Insert material and thickness can be varied as a means of directing installation to a particular clamp force that is desired. Other means of indicating a clamping force are within the scope of the present invention. For example, materials which can change color upon application of a force thereto or provide any other human sensible signal upon application of a clamping force can be provided. Preferred materials include extrudable plastics and rubber. One specific plastic material of utility is DOW-HDPE #25455N.

The insert and the nut can be provided together. If the insert and nut are provided together, in the same package, for example, the insert and nut can be provided already coupled together or uncoupled. The insert and nut can also be provided separately, for example, in different packages for eventual coupling by an end user. The nut may be used multiple times. In general, a new insert is required for each installation.

Figure 3:
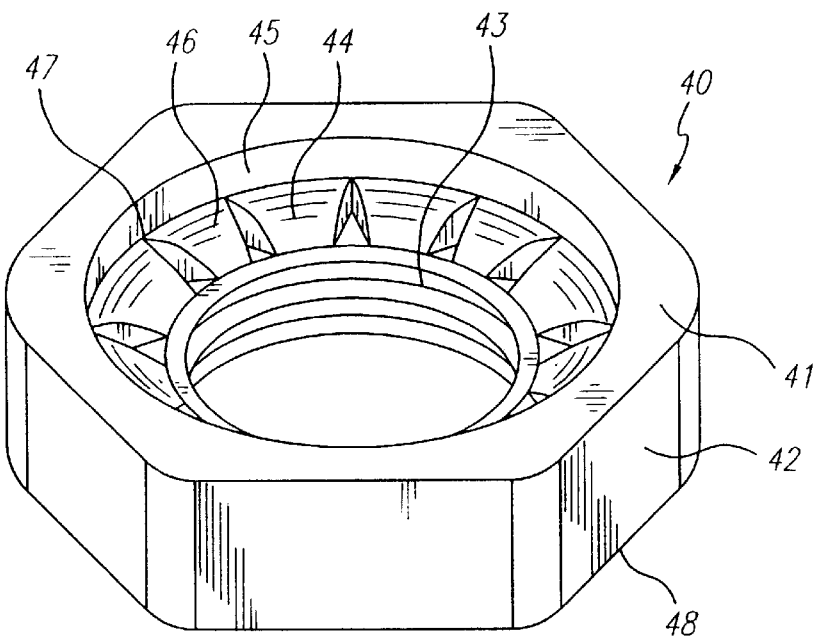
FIG. 3 is a top perspective view of another embodiment of a nut of the present invention.
Figure 4:
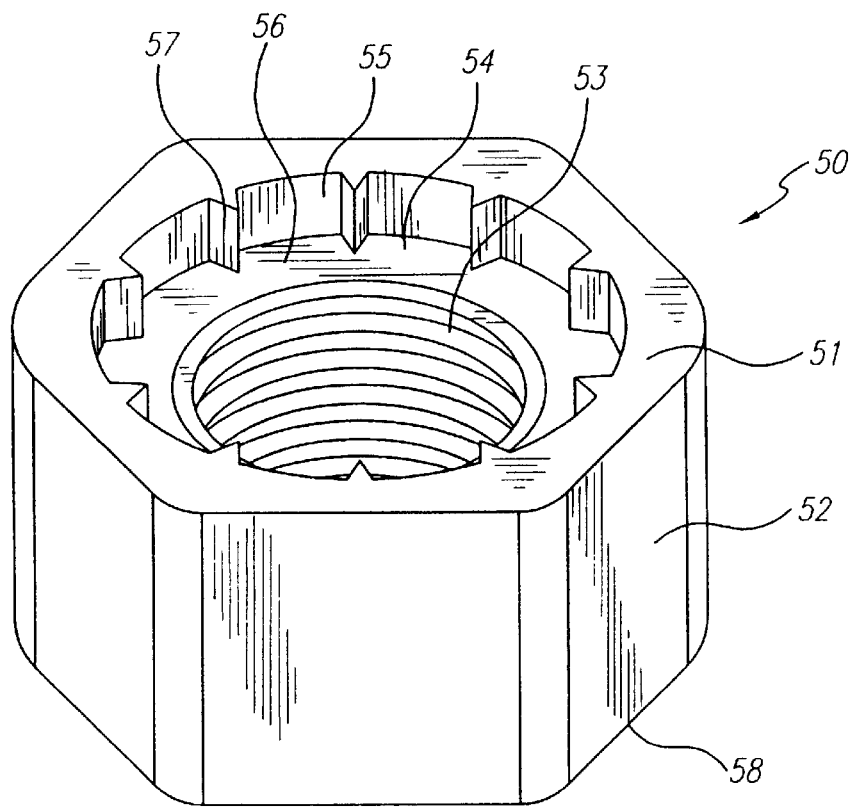
FIG. 4 is a top perspective view of another embodiment of a nut of the present invention.

FIGS. 3 and 4 disclose alternative embodiments of nut insert-engaging portions. Nut 40 includes a sidewall 42, a top face 41 and a bottom face 48. Top face 41 includes a recess 46. The recess 46 includes a bottom wall 44 and a sidewall 45. Nut 40 also includes an orifice 43 therethrough. The orifice 43 is preferably threaded. Bottom wall 44 also includes at least one protrusion 47. As described above an insert can be placed in recess 46 and nut 40 tightened. Upon tightening, protrusion 47 will imbed a portion of cylindrical portion 21 of insert 22, (FIG. 2). This engagement of insert 22 and nut 40 provides for a rotational coupling of the nut and the insert, thereby preventing or at least greatly reducing the incidence of insert and nut separation. In alternative embodiments, in place of protrusion 47 at least one indentation can be disposed on bottom wall 44. The indentation or protrusion can be of various shapes and sizes so long as nut 10 and insert 20 are rotationally coupled upon loosening.

Nut 50 (FIG. 4) includes a sidewall 52, a top face 51 and a bottom face 58. Top face 51 includes a recess 56. The recess 56 includes a bottom wall 54 and a sidewall 55. Nut 50 also includes an orifice 53 therethrough. The orifice 53 is preferably threaded. Sidewall 55 also includes at least one protrusion 57. As described above an insert can be placed in recess 56 and nut 50 tightened. Upon tightening, a portion of cylindrical portion 21 of insert 20 (FIG. 2) will be forced against protrusion 57 and deformed into mating engagement. This engagement of insert 20 and nut 50 provides for a rotational coupling of the nut and the insert, thereby preventing or at least greatly reducing the incidence of insert and nut separation. In alternative embodiments, in place of protrusion 57, at least one indentation can be disposed on sidewall 55. The indentation or protrusion, can be of various shapes and sizes so long as nut 50 and insert 20 are rotationally coupled upon loosening.

Figure 5:
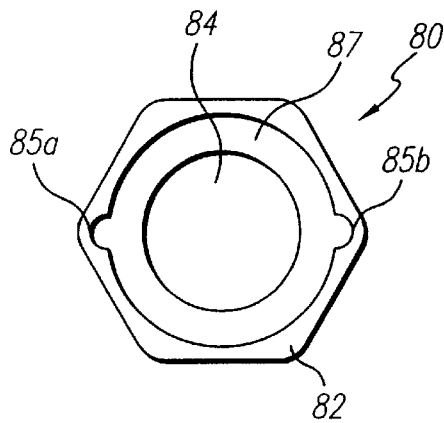
FIG. 5 is a top view of another embodiment of a nut of the present invention.
Figure 6:
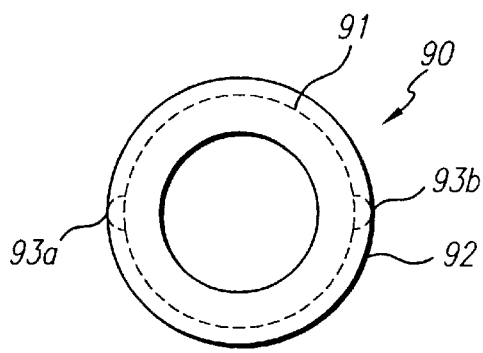
FIG. 6 is a top view of another embodiment of a clamp-force indicating insert of the present invention.

FIGS. 5 and 6 illustrate yet another embodiment of the present invention. Nut 80 has a top face 82, an orifice 84 and preferably a recess 87. Top face 82 includes preformed indentations 85a and 85b. Insert 90 includes a portion 92 extrudable across top face 82 of nut 80, and a cylindrical portion 91. Cylindrical portion 91 includes preformed nut-engaging protrusions 93a and 93b. Preferably nut-engaging protrusions 93a and 93b are completely complementary to indentations 85a and 85b. However, protrusions 93a and 93b and indentations 85a and 85b can be less than completely complementary, so long as some rotational coupling is accomplished. Upon insertion of insert 90 into recess 87 of nut 80 and in particular insertion of protrusions 93a and 93b into indentations 85a and 85b, nut 80 and insert 90 are rotationally coupled. It is to be understood that the opposite arrangement of a preformed complementary protrusion and indentation can be used. Namely, a preformed protrusion on the nut and a preformed nut-engaging indentation on the insert can be used. Also, combinations of a preformed protrusion and a preformed indentation can be used on a nut or an insert. Additionally, the preformed protrusion or preformed indentation can be formed on an undersurface of portion 92 or on a sidewall or a bottom wall of recess 87 or combinations thereof.

Figure 7:
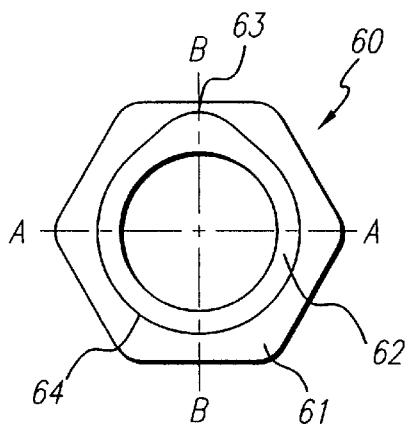
FIG. 7 is a top view of another embodiment of a nut of the present invention.
Figure 8:
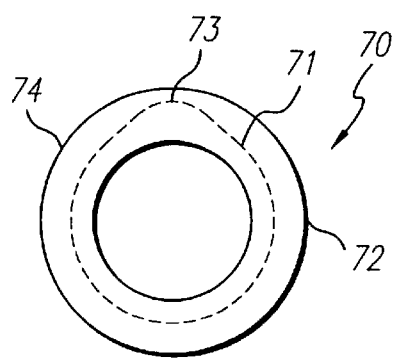
FIG. 8 is a top view of another embodiment of a clamp-force indicating insert of the present invention.

FIGS. 7 and 8 illustrate still another embodiment of the present invention. Nut 60 has a top face 61 and a recess 62 having a sidewall 64. Recess 62 contains a peak 63. The presence of peak 63 at least partially disrupts the symmetry of the perimeter of recess 62. The perimeter of recess 62 includes at least a portion extending down sidewall 64. The perimeter of recess 62 is not completely symmetrical because if a representation of recess 62 was folded across line A—A, peak 63 would not correspond to the portion of recess 62 it was folded onto. However, if a representation of recess 62 was folded across line B—B the left and right sides would correspond. Insert 70 includes a portion 72 extrudable across top face 61 of nut 60 and can include a cylindrical portion 71. Cylindrical portion 71 includes a peak 73. Insert 70 is fittable in recess 62 so that peak 73 engages peak 63 thereby rotationally coupling insert 70 and nut 60. It is to be understood that other partially or completely asymmetrical configurations are within the scope of the present invention. Portion 72 has a perimeter 74 which can be congruent with the perimeter of portion 71 or which can be circular or otherwise shaped.

Alternatively, recess 62 can have a perimeter which includes at least one corner. Typically such a corner will be provided by having recess 62 formed in the shape of a regular polygon. Such polygons include triangular, square, rectangular, pentagonal, hexagonal etc. Insert 20 (FIG. 2) would then preferably have a corresponding perimeter, although, any combination of recess and insert shape which allows for insertion of the insert into the recess and provides rotational coupling can be used.

Figure 9:
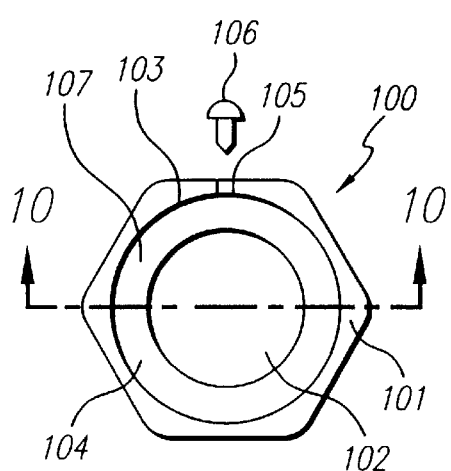
FIG. 9 is a top view of another embodiment of a nut of the present invention.
Figure 10:
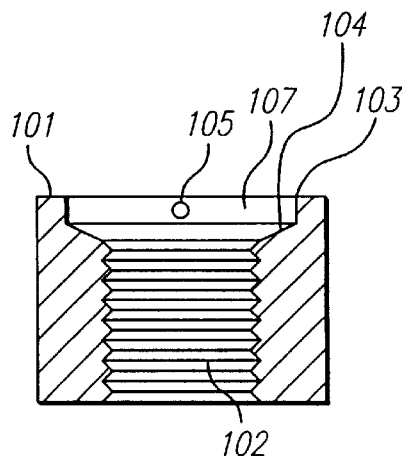
FIG. 10 is a cross-sectional view through line 9—9 of FIG. 9.

FIGS. 9 and 10 illustrate another embodiment of the present invention. Nut 100 has a top face 101 and an orifice 102. Recess 107 includes bottom wall 104 and sidewall 103. Nut 100 also includes a second orifice 105 which preferably is disposed through sidewall 103 of recess 107 as depicted in cross-section in FIG. 10. Insert 20 (FIG. 2) can be fitted into recess 107 and pin 106 can be inserted through orifice 105 and into the cylindrical portion 21 of insert 20, thereby rotationally coupling the insert and the nut.

Figure 11:
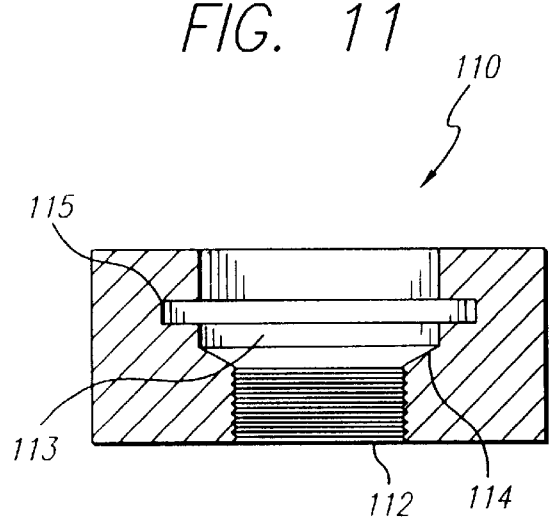
FIG. 11 is a cross-sectional view of another embodiment of a nut of the present invention.
Figure 12:
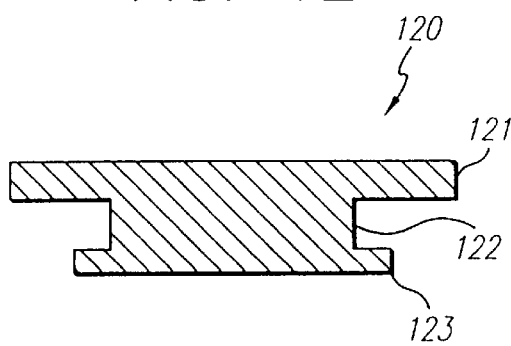
FIG. 12 is a cross-sectional view of another embodiment of a clamp-force indicating insert of the present invention.

FIGS. 11 and 12 illustrate still another embodiment of the present invention. Nut 110, shown in cross-section includes a threaded orifice 112 and a recess 113 having a bottom wall 114. Recess 113 also includes circumferential groove 115 thereabout. Insert 120, which includes deformable lip 121, cylindrical portion 122 and lower lip 123 is shown in FIG. 12 and in place in FIG. 11. Lower lip 123 engages in a snap-lock fashion groove 115 in nut 110.

Figure 13:
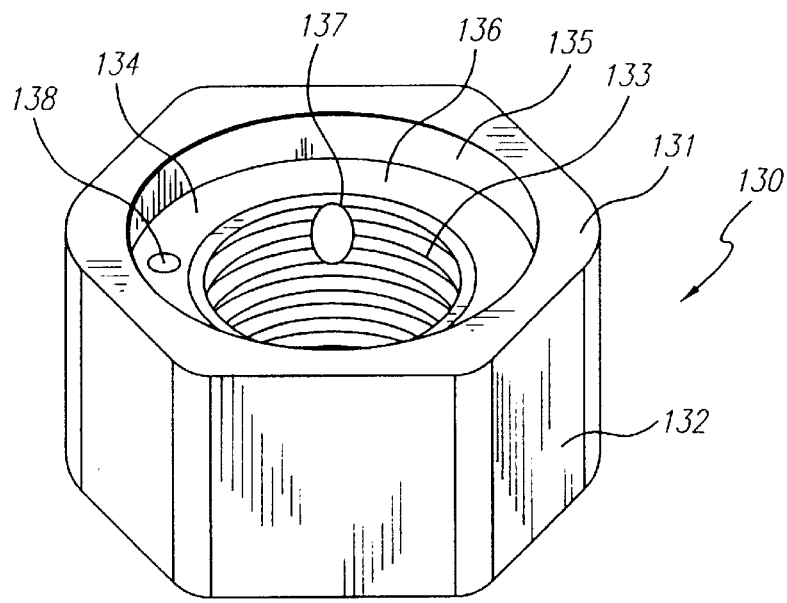
FIG. 13 is a top perspective view of another embodiment of a nut of the present invention.

FIG. 13 illustrates nut 130 which includes top face 131, outer sidewall 132, threaded orifice 133 and recess 134. Recess 134 includes bottom wall 136 and sidewall 135. Adhesive 138 can be applied to recess 134 or adhesive 137 can be applied to threaded orifice 133. The adhesive could also be applied to the insert rather than the nut. In this regard, for purposes of this invention, the thread area is intended to mean not only those surfaces that are threaded, but also those that are functionally although not necessarily physically threaded such as friction coatings. A pliable friction coating that simply interferes with thread clearance would have beneficial effects similar to an adhesive coating.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A fastener system comprising:
   a) a nut having a body, the body having a top face and a bottom face, the body further having an orifice extending therethrough, wherein rotation of the nut on a bolt extending through the orifice provides for the exertion of a clamp force by the nut against a surface;
   b) means for indicating the clamp force applied by the nut on the surface, wherein the means for indicating the clamp force is disposed between the top face of the nut and the surface and comprises an extrudable lip; and
   c) means for rotationally coupling the nut and the clamp-force indicating means.

2. The fastener system of claim 1 wherein the coupling means couples the nut and the clamp-force indicating means upon initial engagement of the nut and the clamp-force indicating means.

3. The fastener system of claim 1 wherein the coupling means couples the nut and the clamp-force indicating means following application of a minimum clamping force to the clamp-force indicating means.

4. The fastener system of claim 1 wherein the top face of the nut further includes a recess disposed about the orifice.

5. The fastener system of claim 4 wherein the clamp-force indicating means comprises a portion extrudable across the top face of the nut.

6. The fastener system of claim 5 wherein the clamp-force indicating means further comprises a portion for insertion into the recess.

7. A fastener system comprising:
a) a nut having a body, the body having a top face, a bottom face, and an orifice extending therethrough; and
b) a clamp-force indicating insert for use with the nut, the insert comprising a portion extrudable across the top face of the nut, the portion comprising an extrudable lip extending outwardly from the insert,
wherein the nut further includes at least one insert-engaging portion.

8. The fastener system of claim 7 wherein the insert-engaging portion of the nut comprises at least one indentation.

9. The fastener system of claim 7 wherein the insert-engaging portion of the nut comprises at least one protrusion.

10. The fastener system of claim 7 wherein the insert includes at least one indentation.

11. The fastener system of claim 7 wherein the insert includes at least one protrusion.

12. The fastener system of claim 7 further including a second orifice disposed in the body of the nut.

13. The fastener system of claim 12 further including a pin for insertion in the second orifice.

14. The fastener system of claim 7 wherein the insert-engaging portion of the nut comprises an adhesive.

15. The fastener system of claim 7 wherein the insert comprises a compressible material.

16. The fastener system of claim 7 wherein the insert comprises a plastic material.

17. The fastener system of claim 7 wherein the top face of the nut further includes a recess disposed about the orifice.

18. The fastener system of claim 10 wherein the clamp-force indicating insert further comprises a portion for insertion into the recess.

19. The fastener system of claim 10 wherein the insert-engaging portion of the nut comprises at least one protrusion disposed in the recess of the nut.

20. The fastener system of claim 10 wherein the recess includes a sidewall and the insert-engaging portion of the nut comprises at least one protrusion disposed on the sidewall of the recess.

21. The fastener system of claim 10 wherein the recess includes a bottom wall and the insert-engaging portion of the nut comprises at least one protrusion disposed on the bottom wall of the recess.

22. The fastener system of claim 10 wherein the recess disposed about the orifice has a circular perimeter.

23. The fastener system of claim 10 wherein the recess disposed about the orifice has a polygonal perimeter.

24. The fastener system of claim 10 wherein the recess disposed about the orifice has at least a partially asymmetrical perimeter.

25. The fastener system of claim 10 wherein the recess further includes at least one circumferential groove formed thereabout.

26. The fastener system of claim 25 wherein the insert further comprises a lip for insertion into the groove.

27. A fastener system comprising:
a) a nut having a body, the body having a top face and a bottom face, the body further having an orifice extending therethrough;
b) a clamp-force indicating insert for use with the nut, the insert comprising a portion extrudable across the top face of the nut, the portion comprising an extrudable lip extending outwardly from the insert,
wherein the insert further includes at least one nut-engaging portion.

28. The fastener system of claim 27 wherein the top face of the nut further includes a recess disposed about the orifice.

29. The fastener system of claim 27 wherein the clamp-force indicating insert further comprises a second portion for insertion into the recess.

30. A clamp-force indicating insert for use with a nut, comprising:
a) an extrudable portion for providing an indication of a clamp force, the portion comprising an extrudable lip extending outwardly from the insert; and
b) a nut-engaging portion.

31. The insert of claim 30 wherein the portion for providing an indication of a clamp force comprises an extrudable lip.

32. The insert of claim 30 further comprising a lip disposed opposite the portion for providing an indication of a clamp force.

33. A nut for use with a clamp-force indicating insert, the nut having a body, the body having a top face, a bottom face and at least one side face, the body further having an orifice extending therethrough, the top face further including an insert-engaging portion for rotationally coupling a clamp-force indicating insert to the nut, the insert engaging portion selected from the group consisting of a) a recess disposed in the top face, wherein the recess has an at least partially asymmetrical perimeter, b) a recess disposed in the top face, wherein a slot is formed at least partially about the recess, and c) an orifice disposed through the at least one side face of the nut.

34. A fastener system comprising a) a nut including a body having an orifice, and b) an insert having an extrudable lip and a portion that engages a portion of the nut so that rotational coupling is accomplished.

35. A fastener system comprising a nut including a body having an orifice, and an insert, the insert being disposed adjacent to a surface of the nut, the insert and the surface of the nut corresponding to placement of the insert being complementarily shaped sufficient to accomplish rotational coupling.

* * * * *